US011399661B2

(12) United States Patent
Gang

(10) Patent No.: US 11,399,661 B2
(45) Date of Patent: Aug. 2, 2022

(54) DRINKING VESSEL FOR CONTAINING A LIQUID AND INSULATING A BOTTLE OR CAN

(71) Applicant: Starline Global Inc., Bridgetown (BB)

(72) Inventor: Hu Gang, Jinhua (CN)

(73) Assignee: Starline Global Inc., Bridgetown (BB)

( * ) Notice: Subject to any disclaimer, the term of this patent is extended or adjusted under 35 U.S.C. 154(b) by 0 days.

(21) Appl. No.: 15/967,554

(22) Filed: Apr. 30, 2018

(65) Prior Publication Data
US 2018/0310766 A1    Nov. 1, 2018

Related U.S. Application Data

(60) Provisional application No. 62/492,285, filed on Apr. 30, 2017.

(51) Int. Cl.
| | | |
|---|---|---|
| B42D 3/18 | (2006.01) | |
| A47J 41/00 | (2006.01) | |
| A47G 19/22 | (2006.01) | |
| A47J 41/02 | (2006.01) | |
| B65D 81/38 | (2006.01) | |

(52) U.S. Cl.
CPC ...... *A47J 41/0061* (2013.01); *A47G 19/2272* (2013.01); *A47G 19/2288* (2013.01); *A47J 41/0011* (2013.01); *A47J 41/02* (2013.01); *B65D 81/3881* (2013.01); *B65D 81/3886* (2013.01)

(58) Field of Classification Search
CPC ... A47J 41/0061; A47J 41/02; A47G 19/2272; A47G 19/2288; B65D 81/3881; A45C 11/04; A45C 11/182

USPC .......................................................... 206/216
See application file for complete search history.

(56) References Cited

U.S. PATENT DOCUMENTS

| | | | | |
|---|---|---|---|---|
| 4,163,374 A | * | 8/1979 | Moore ............... | B65D 81/3883 |
| | | | | 220/592.01 |
| 4,823,974 A | * | 4/1989 | Crosser .............. | A47G 19/2288 |
| | | | | 206/545 |
| 10,173,827 B1 | * | 1/2019 | Foote, Jr. .......... | B65D 81/3876 |
| | | | (Continued) | |

FOREIGN PATENT DOCUMENTS

CN    205697036 U    11/2016

OTHER PUBLICATIONS

English translation of CN205697036 (Year: 2016).*

*Primary Examiner* — King M Chu
(74) *Attorney, Agent, or Firm* — Hodgson Russ LLP

(57) ABSTRACT

The present disclosure may be embodied as a drinking vessel having an insulating body. The insulating body includes a cavity for containing a liquid. The cavity has a bottom and a cylindrical side wall. A top portion of the cylindrical side wall is internally threaded. The insulating body further includes a base with a storage mount. The storage mount is internally threaded. A lid having a drinking orifice is provided. The lid is externally threaded. The lid is configured to couple with the threads of the cavity or the threads of the storage mount such that the lid may be selectively coupled. The drinking vessel may further include a clamping ring. The clamping ring is externally threaded to couple with the cavity or the storage mount. The clamping ring is configured to cooperate with the cavity to secure a can or bottle within the cavity.

11 Claims, 2 Drawing Sheets

(56) References Cited

U.S. PATENT DOCUMENTS

2010/0181278 A1\* 7/2010 Martin .................. B65D 1/023
  215/40
2014/0284342 A1\* 9/2014 Hewitt ............... B65D 81/3881
  220/592.24

\* cited by examiner

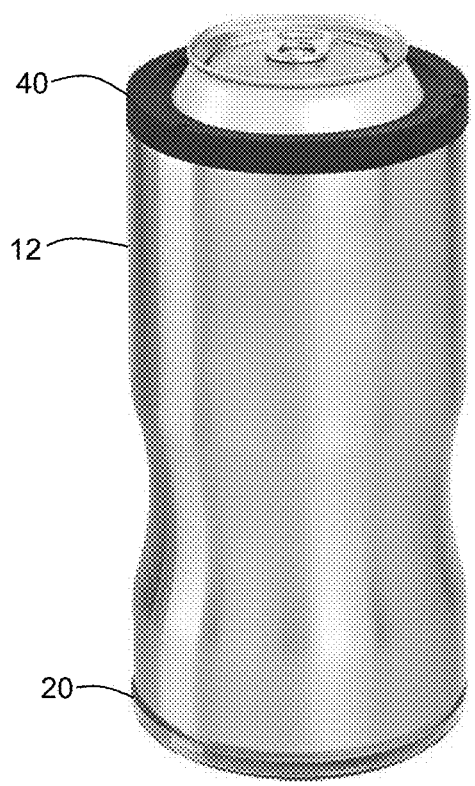
Fig. 3A                                  Fig. 3B

DRINKING VESSEL FOR CONTAINING A LIQUID AND INSULATING A BOTTLE OR CAN

CROSS REFERENCE TO RELATED APPLICATIONS

This application claims priority to U.S. provisional Application No. 62/492,285, filed on Apr. 30, 2017, now, the disclosure of which is incorporated herein by reference.

FIELD OF THE DISCLOSURE

The present disclosure relates to tumblers and drinking vessels.

BACKGROUND OF THE DISCLOSURE

Typically, insulated tumblers are commonplace for containing drinks and maintaining the temperature of the drinks as, for example, hot (for coffee, tea, etc.) or cold (for soft drinks, water, etc.) When a beverage was contained in a container such as soft drink in a can, the tumbler was only useful when the beverage was transferred into the tumbler cavity (e.g., poured from the can). Alternatively, a person could use an insulated holder which would envelop the can or bottle. However, such insulated holders were not functional for containing beverages without the can or bottle. There is a need for a vessel which can contain a beverage with or without the beverage can or bottle.

BRIEF SUMMARY OF THE DISCLOSURE

The present disclosure may be embodied as a drinking vessel having an insulating body. The insulating body may be, for example, vacuum insulated. The insulating body includes a cavity for containing a liquid. The cavity has a bottom and a cylindrical side wall. A top portion of the cylindrical side wall is internally threaded. The insulating body further includes a base with a storage mount. The storage mount is internally threaded. A lid having a drinking orifice is provided. The lid is externally threaded. The lid is configured to couple with the threads of the cavity or the threads of the storage mount such that the lid may be selectively coupled. The drinking vessel may further include a clamping ring. The clamping ring is externally threaded to couple with the cavity or the storage mount. The clamping ring is configured to cooperate with the cavity to secure a can or bottle within the cavity. The cavity and clamping ring may be configured to secure a standard bottle, such as a U.S. industry standard bottle (ISB)—i.e., a longneck bottle. The cavity and clamping ring may be configured to secure a standard can, such as a standard U.S. 12-fluid ounce beverage can.

DESCRIPTION OF THE DRAWINGS

For a fuller understanding of the nature and objects of the disclosure, reference should be made to the following detailed description taken in conjunction with the accompanying drawings, in which:

FIG. 3A shows the vessel of FIGS. 1A and 2A, wherein a standard 12 ounce bottle is secured by the clamping ring; and FIG. 3B shows the vessel of FIGS. 1A and 2A, wherein a standard 12 ounce can is secured by the clamping ring.

DETAILED DESCRIPTION OF THE DISCLOSURE

Figure 1B:
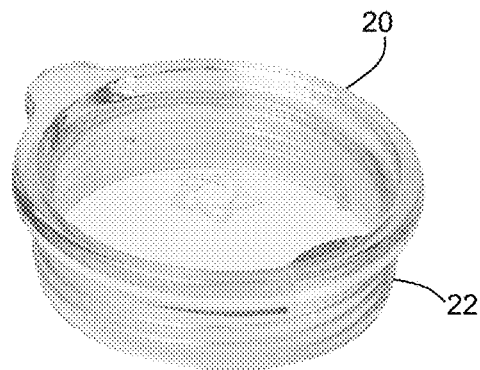
FIG. 1B shows the lid of the drinking vessel of FIG. 1A.
Figure 1A:
FIG. 1A shows a drinking vessel according to an embodiment of the present disclosure having a lid coupled to the cavity for containing a liquid and a clamping ring coupled to the storage mount.

With reference to FIG. 1A, the present disclosure may be embodied as a drinking vessel 10. In an embodiment, the drinking vessel 10 has a body 12 with a top end and a bottom end. The body 12 (e.g., the top end of the body) has a cavity 14 having a bottom and a cylindrical side wall. In some embodiments, the body 12 is insulative. For example, in some embodiments, the body has an interior defined by outer and inner walls and containing a vacuum between the outer and inner walls. In other embodiments, the body 12 comprises an insulating material such as a foam. A top portion of the cylindrical side wall is internally threaded. The body may be made from any suitable material, such as, for example, metals (e.g., stainless steel, etc.), plastics, or other materials, or combinations of materials.

In some embodiments, the drinking vessel 10 includes a lid 20 with a drinking orifice 22 (see, e.g., FIG. 1B). The lid 20 is externally threaded 24. The external threads 24 are configured to couple to the internal threads of the cavity 14. In this configuration, the cavity 14 and lid 20 cooperate to contain a liquid. A user of the drinking vessel 10 can then drink the liquid by way of the orifice 22. The lid 20 may have a top edge 24 which is flat. In this way, when the lid 20 is coupled to the base 30 of the vessel 10, the vessel 10 will be maintained upright (i.e., orthogonal to a horizontal surface, not at an angle).

The body 12 of the vessel 10 has a base 30 (e.g., at the bottom end of the body) with a storage mount 32 for storing the lid 20. The storage mount 32 is internally threaded such that the lid may be coupled with the storage mount 32 when stored. In this way, a user of the drinking vessel 10 may selectively couple the lid 20 to the cavity 14 or to the storage mount 32. For example, the base 30 may be recessed and the recess may incorporate internal threads.

Figure 2B:
FIG. 2B shows the lid of the drinking vessel of FIGS. 1A and 2A.

In some embodiments, the drinking vessel 10 has a clamping ring 40 (see, e.g., FIG. 2B). The clamping ring 40 is externally threaded 42 so as to couple to the cavity 14 or to the storage mount 32. When coupled to the cavity 14, the clamping ring 40 is configured to cooperate with the cavity 14 to secure (i.e., securely hold) a bottle or a can. For example, FIG. 3A shows a drinking vessel 10 with a clamping ring 40 securing a U.S. industry standard bottle (ISB) 90—i.e., a standard longneck bottle. In FIG. 3B, a standard U.S. 12-ounce beverage can is secured by the clamping ring 40.

Figure 2A:
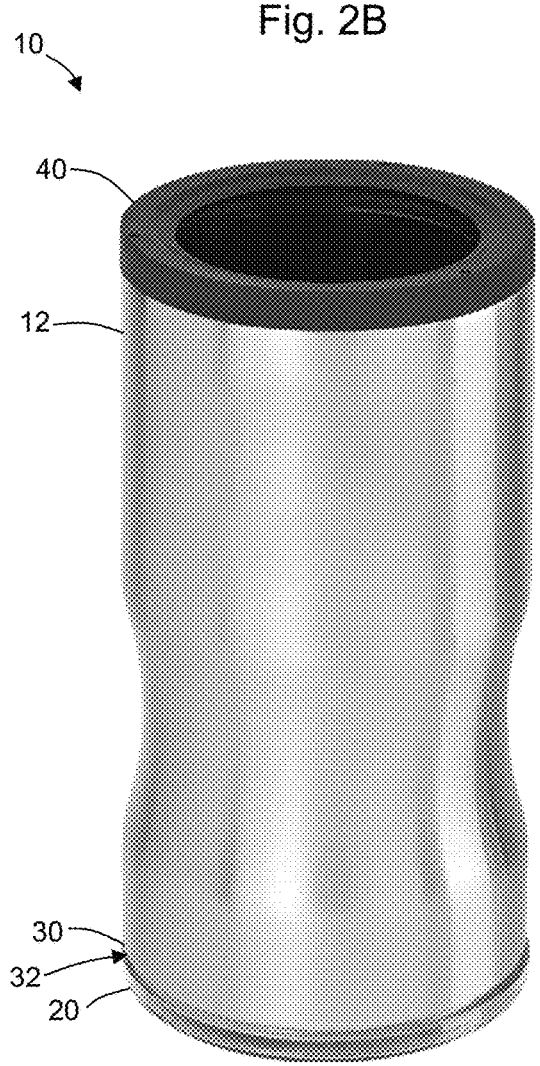
FIG. 2A shows the drinking vessel of FIG. 1A wherein the lid is coupled to the storage mount and the clamping ring coupled to the cavity for securing a can or bottle.

In some embodiments, a drinking vessel includes both a lid 20 and a clamping ring 40. In such embodiments, the lid 20 may be coupled to the cavity 14 while the clamping ring 40 is coupled to the base 30 (see, e.g., FIG. 1A), or the clamping ring 40 may be coupled to the cavity while the lid 20 is coupled to the base 30 (see, e.g., FIG. 2A).

Although the present disclosure has been described with respect to one or more particular embodiments, it will be understood that other embodiments of the present disclosure may be made without departing from the spirit and scope of the present disclosure.

I claim:

1. A drinking vessel, comprising:
    an insulating body, comprising:
        a cavity for containing a liquid, the cavity having a bottom and a cylindrical side wall, and wherein a top portion of the cylindrical side wall is internally threaded; and
        a base having storage mount, wherein the storage mount is internally threaded;
    a lid having a drinking orifice, the lid being externally threaded and wherein the lid is configured to couple with the threads of the cavity or the threads of the storage mount such that the lid may be selectively coupled to either of the cavity or the storage mount; and
    a clamping ring, wherein the clamping ring is externally threaded to couple with the cavity or the storage mount, and wherein the clamping ring is configured to cooperate with the cavity to secure a can or bottle.

2. The drinking vessel of claim 1, wherein the cavity and the clamping ring are configured to secure a U.S. industry standard bottle.

3. The drinking vessel of claim 1, wherein the cavity and the clamping ring are configured to secure a standard U.S. 12-ounce beverage can.

4. The drinking vessel of claim 1, wherein a top edge of the lid is flat.

5. The drinking vessel of claim 1, wherein the body is vacuum insulated.

6. The drinking vessel of claim 1, wherein in the body is metal.

7. The drinking vessel of claim 1, wherein the lid is plastic.

8. A drinking vessel, comprising:
    an insulating body, comprising:
        a cavity for containing a liquid, the cavity having a bottom and a cylindrical side wall, and wherein a top portion of the cylindrical side wall is internally threaded; and
        a base having storage mount, wherein the storage mount is internally threaded;
    a clamping ring, wherein the clamping ring is externally threaded to couple with the cavity or the storage mount, and wherein the clamping ring is configured to cooperate with the cavity to secure a can or bottle.

9. The drinking vessel of claim 8, further comprising a lid having a drinking orifice, the lid being externally threaded and wherein the lid is configured to couple with the threads of the cavity or the threads of the storage mount such that the lid may be selectively coupled to either of the cavity or the storage mount.

10. The drinking vessel of claim 8, wherein the cavity and the clamping ring are configured to secure a U.S. industry standard bottle.

11. The drinking vessel of claim 8, wherein the cavity and the clamping ring are configured to secure a standard U.S. 12-ounce beverage can.

* * * * *